Feb. 6, 1951 — C. R. BERGER, JR — 2,540,806
HEAT-TREATING FURNACE
Filed Oct. 4, 1945 — 2 Sheets-Sheet 1
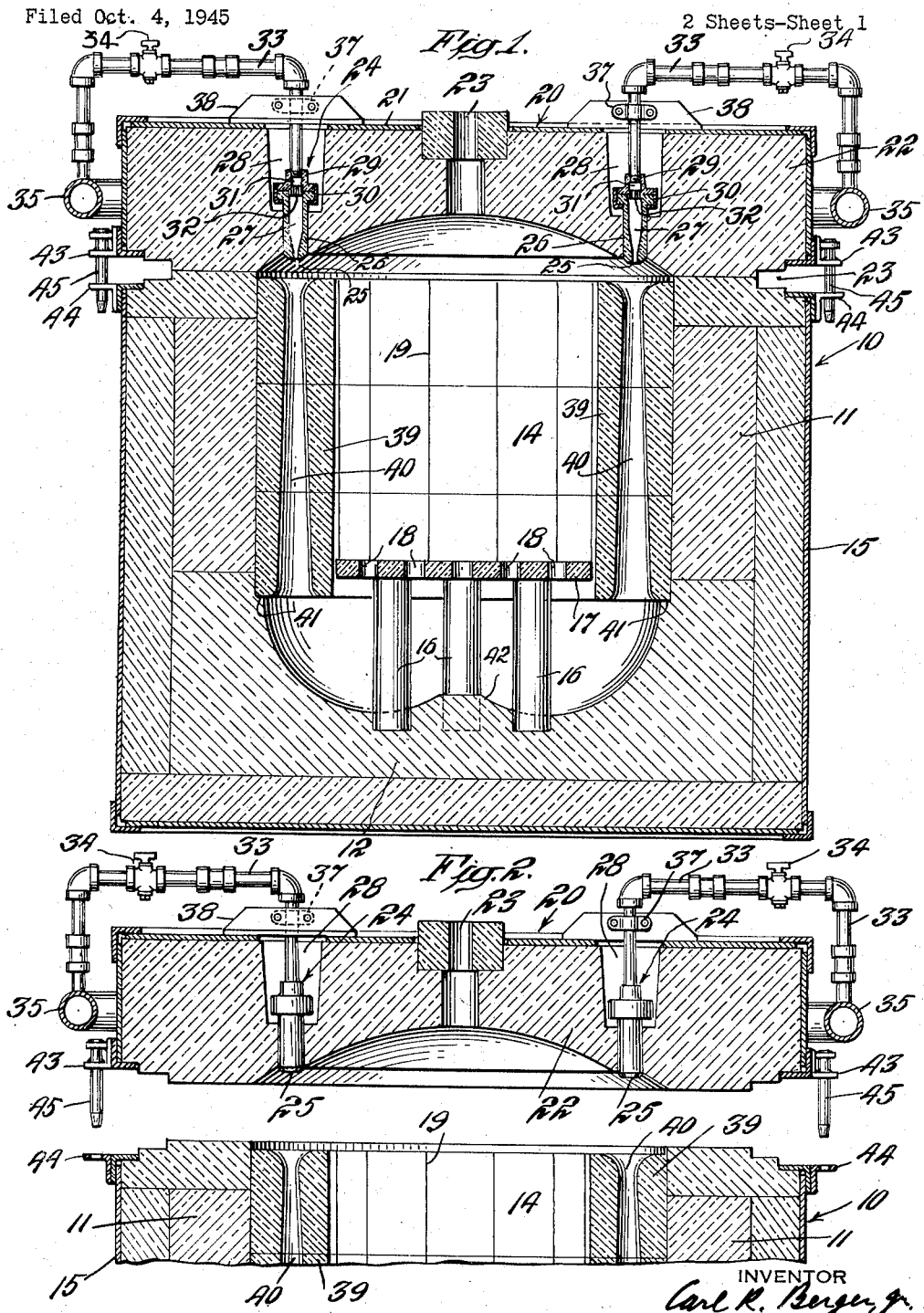
INVENTOR
Carl R. Berger, Jr.
BY
his ATTORNEY

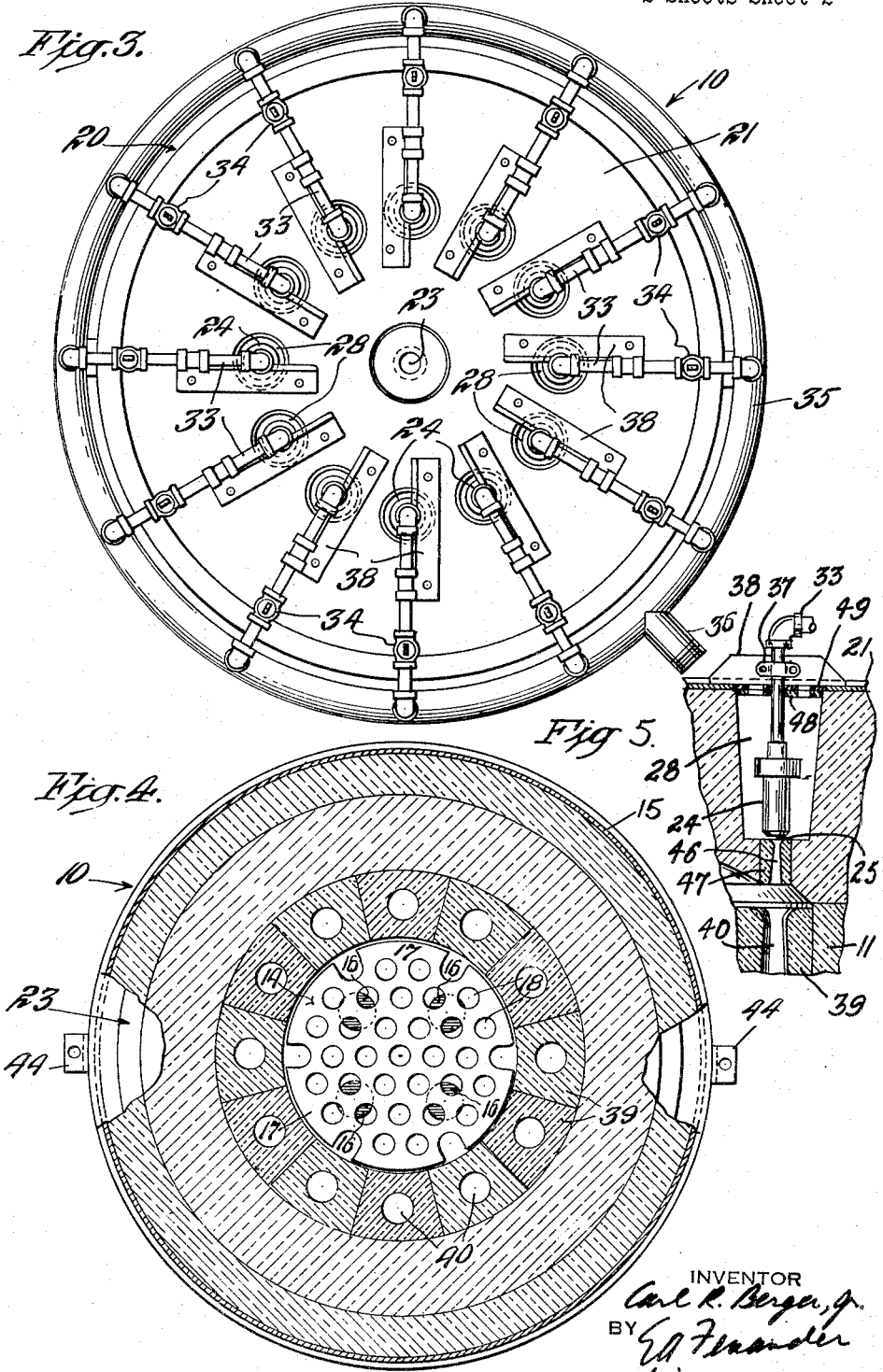

Patented Feb. 6, 1951

2,540,806

UNITED STATES PATENT OFFICE 2,540,806

HEAT-TREATING FURNACE

Carl R. Berger, Jr., Philadelphia, Pa., assignor to Selas Corporation of America, Philadelphia, Pa., a corporation of Pennsylvania Application October 4, 1945, Serial No. 620,300

10 Claims. (Cl. 263—43)

My invention relates to heat treating furnaces fired by a combustible fuel mixture, and is especially concerned with such furnaces in which temperature equalization is accomplished by circulation of the heated gaseous atmosphere therein.

It is an object of my invention to provide an improvement for equalizing the temperatures in a heat treating furnace in which gaseous products of combustion produced by combustion of a combustible fuel mixture are introduced at a high velocity into the furnace and the velocity energy of the gaseous products of combustion is utilized to induce circulation of the gaseous atmosphere in the furnace, whereby equalization of temperatures may be accomplished solely by such induced circulation of the gaseous atmosphere without the aid of a circulating fan.

The novel features which I believe to be characteristic of my invention are set forth with particularity in the claims. The invention, both as to organization and method, together with the above and other objects and advantages thereof, will be better understood by reference to the following description taken in connection with the accompanying drawings forming a part of this specification, and of which:

Fig. 1 is a vertical sectional view of one form of heat treating furnace embodying the invention;

Fig. 2 is a fragmentary vertical sectional view of the top part of the furnace of Fig. 1 with the roof in a raised position;

Fig. 3 is a top plan view of the furnace of Figs. 1 and 2;

Fig. 4 is a top plan view of the furnace of Figs. 1 and 2 with the roof removed, partly broken away and in section, to illustrate the furnace more clearly; and Fig. 5 is a fragmentary vertical sectional view of a heat treating furnace illustrating a modification of the invention.

In the drawings I have shown a heat treating furnace 10 embodying the invention comprising an annular-shaped side wall 11 and a floor 12 defining a chamber 14. The side wall 11 and floor 12 are formed of suitable refractory material and supported and enclosed in an outer metallic shell 15.

In the floor 12 are embedded the lower ends of vertical posts 16 at the upper ends of which rests a cylindrical plate 17, having apertures 18 therein, for supporting an open wire basket 19 or the like adapted to contain the work pieces to be heat treated. In order to withstand the high temperature heating effects produced in chamber 14, the posts 16 and plate 17 may be formed of suitable refractory ceramic material, and the basket 19 may be formed of suitable metal, such as, for example, stainless steel and the like.

The furnace 10 is provided with a removable roof or cover 20 comprising an outer metallic shell 21 enclosing a wall 22 of suitable refractory material, these parts being formed to provide a central aperture 23 for the escape of excess furnace gases from the chamber 14. When the roof 20 is in position, the refractory wall 22 rests snugly against the top edge of side wall 11. The abutting walls 11 and 22 are stepped, as indicated at 23 in Fig. 1, and the gap therebetween may be filled with suitable insulating material (not shown), such as asbestos rope and the like, for example, to insure a gas-tight seal.

In accordance with my invention the refractory lined chamber 14 is fired by a combustible fuel mixture in such a manner that the resulting products of combustion are discharged at a high velocity into chamber 14, and the velocity energy of the products of combustion is utilized to induce circulation of the gaseous atmosphere in chamber 14 to effect equalization of temperatures therein. I accomplish this by providing in the roof 21 a plurality of burners 24 in each of which substantially complete combustion of a combustible fuel mixture is accomplished and from the restricted outlets 25 of which high temperature gases are discharged at a high velocity, such gases consisting substantially entirely of heated products of combustion.

The burners 24, which are distributed in a circle in the roof 21, comprise elongated hollow refractory shells 26 defining small combustion chambers 27 each having a restricted outlet 25. The burner shells 26 snugly fit in the bottom narrow portion of apertures 28 formed in the roof 21, so that the outlets 25 are substantially at the inner surface of the refractory roof wall 22 and adjacent to the side wall 11.

In the top wider portions of the apertures 28, the upper flanged ends of the shells 26 are secured to hollow base members 29 by flanged clamping rings 30 threadedly secured thereto. Each base member 29 provides an inlet chamber 31, and between the inlet chamber and combustion chamber 27 is provided an orifice wall having a plurality of small openings or orifices 32 therein.

Each burner 24 is connected by piping 33, having a valve 34 connected therein, to a manifold 35 encircling the roof 20 and to which a combustible fuel mixture is delivered at an inlet 36 from a suitable source of supply. The piping 33 for each burner 24 is secured at 37 to a bracket 38 fixed to the shell 21 at the region of an aperture 28, so that all of the piping and the manifold 35 are carried and supported by the roof 20 through the brackets 38 and none of the weight of these parts is transmitted to the burners 24.

In order to efficiently utilize the high velocity gas streams discharged from the burners 24 to induce circulation of the gaseous atmosphere in the chamber 14, a number of elongated refractory members 39 are positioned at the side wall 11 in each of which is formed an axially extending passage 40 having the upper end thereof in alignment with the discharge orifice 25 of one of the burners 24. As shown in Fig. 4, the refractory members 39 are trapezoidal in section and in abutting relation and shaped to form a cylindrical inner wall for the chamber 14. The floor 12 is notched at a region below the plate 17 to provide an annular shoulder 41 for supporting the members 37 at the outer peripheral portions thereof.

In the illustrated embodiment, in order to promote rapid circulation of the gaseous atmosphere in the chamber 14, the passage 40 of each member 39 is Venturi-shaped and formed with an outwardly flaring entrance cone spaced from and closely adjacent to the discharge orifice 25 of one of the burners 24 from which a high velocity gas stream is discharged, whereby efficient transformation of the velocity energy of the gas stream into pressure energy is effected in the expanding or discharge cone of the Venturi passage. To further promote the rapid circulation of the gaseous atmosphere in the chamber 14, the inner surface of the floor 12 is curved and rounded and includes a raised central portion 42 to impart an upward sweep to the gases discharged from the lower ends of the passages 40.

To facilitate alignment of the burners 24 and the passages 40 in the members 39, the top edge of the casing 15 and the bottom edge of the shell 21 are each provided with apertured angle brackets 43 and 44, respectively, at diametrically opposite sides of the furnace 10. The brackets 43 and 44 are so positioned that, when these parts are in alignment and the apertures therein can receive pins 45, the discharge orifices 25 of the burners 24 are in alignment with the passages 40 in the members 39.

In operating the furnace 10 just described, the articles to be heat treated are placed in the basket 19 which is inserted into the chamber 14 upon the supporting plate 17. While the roof or cover 20 is still in a raised position, as shown in Fig. 2, the burners 24 are ignited. This is accomplished by opening the valves 34 and delivering to the burners 24 a premixed combustible fuel mixture including a gaseous fuel and a combustion supporting gas, such as air or a mixture of air and oxygen, for example.

When the burners 24 are relatively cool and at the temperature of the surroundings, the premixed fuel mixture supplied thereto passes through the inlet chamber 31, orifice walls and chambers 27 from which it is discharged through the restricted outlets or discharge orifices 25. When a premixed combustible fuel mixture of air and ordinary gas, such as city gas, natural gas and the like, for example, is delivered to the burners 24, the fuel mixture is initially supplied at a relatively low pressure, such as that equivalent to five or six inches of water column, for example, so that the fuel mixture discharged from the chambers 27 can be ignited to produce and maintain flames at the discharge orifices 25. With the flames being maintained at the discharge orifices 25, the pressure of the fuel mixture supplied to the burners 24 is then reduced sufficiently to cause the flames to backfire from the discharge orifices 25 onto the orifice walls in the chambers 27. Under these conditions a plurality of small flames are produced and maintained at the lower ends of the orifices 32.

After the flames are being maintained within the chambers 27 at the lower ends of the orifices 32, the pressure of the fuel mixture supplied to the burners 24 may be increased. After a short interval of time, the flames maintained at the bottom surfaces of the orifice walls effect such heating of the inner refractory surfaces of the shells 26 that these surfaces are heated to a high incandescent temperature. Due to heating the inner refractory linings of the burners 24 to a high temperature, complete combustion of the fuel mixture is accomplished in the small chambers 27 before the fuel mixture reaches the restricted outlets 25. From the restricted outlet 25 of each burner is discharged a high velocity jet or stream of heated gases consisting substantially entirely of the heated products of combustion.

The combustion conditions in the small chambers 27 are such that rapid flame propagation is effected, thereby permitting the combustible fuel mixture to be supplied to the burners 24 at a relatively high delivery pressure which may be as high as 5 lbs. per square inch or higher. When using a combustible mixture of ordinary gas and air, the products of combustion are discharged from the restricted outlets 25 at an elevated temperature of 2600° F. and higher and at an average velocity of 750 feet or more per second or at a maximum velocity of 1000 feet or higher per second. Since the fuel mixture is introduced into the combustion chambers 27 at a temperature of about 70° F. and heated to a temperature of 2600° F. and higher, the gases expand approximately at least six-fold or more and at a rate directly proportional to increase in absolute temperature.

The high velocity at which the heated gases are discharged from the burners 24 is attributable to the fact that combustion of the gas mixture is effected substantially entirely within the combustion chambers 27 in which the gases undergo considerable expansion, as just pointed out. Due to the manner in which combustion is accomplished, therefore, the burners 24 may be operated at relatively high gas mixture delivery pressures to produce the high velocity gas streams which are discharged from the burners 24 at an elevated temperature approximately equal to the temperatures maintained in the combustion chambers 27.

The high temperature products of combustion discharged from the burners 24 pass through the passages 40 and thence upwardly through the apertures 18 in the plate 17. After the burners 24 have been operating for an interval of time, the inner refractory lining of the chamber 14 is heated to a highly radiant condition due to the high temperature gases sweeping over the surfaces thereof. The surfaces of the Venturi-shaped passages 40 are likewise heated to a highly radiant condition by reason of the high temperature gases passing therethrough.

The jets or streams of high temperature gases discharged from the restricted outlets 25 of the burners 24 induce flow of gaseous atmosphere into the upper ends of the passages 40, the size of the entrance cone of each Venturi-shaped passage being so related to the jet of high temperature gases that sufficient space is provided to insure an even flow of gaseous atmosphere into the entrance cone. By providing properly designed Venturi-shaped passages 40, the energy of the driving high temperature gas jets is effectively utilized to produce a uniform mixture which is discharged from the lower ends of the passages at a relatively high pressure. By way of example and without limitation, when the high temperature gas jets are discharged at an average velocity of 750 feet per second or higher into the passages 40, vigorous circulation of the gaseous atmosphere in the chamber 14 is effected in which the velocity of the gases may be as high as 100 feet per minute or higher.

Since high temperature heating effects as high as 2600° F. or higher may be produced in the chamber 14 with vigorous circulation of the gaseous atmosphere which is slightly above atmospheric pressure, it will be evident that the furnace of the invention is especially useful for heat treating articles at such high temperatures in which gas circulating fans have not been practical because of the excessively high temperatures involved.

While the inner lining of the chamber 14 is heated to a highly radiant condition and heat is radiated therefrom to the articles in basket 19 directly exposed to such radiant heating component, the fact that the gaseous atmosphere is at or slightly higher than the temperature of the lining and vigorous circulation of the gaseous atmosphere is effected, as explained above, insures temperature equalization in the chamber 14 whereby all of the articles in the basket 19 are heated substantially uniformly to the same temperature by convection heating.

The furnace of the invention is extremely flexible in operation and capable of producing heating effects over a wide temperature range. When the maximum temperature is desired in chamber 14, all of the burners 24 are operated; and when heat treating temperatures below the maximum temperature are desired, some of the burners 24 are not employed. Even when the number of burners 24 employed is reduced as much as fifty per cent and only half of the burners are operated, vigorous circulation of the gaseous atmosphere in chamber 14 is still effected to produce temperature equalization in the furnace. Further, the gaseous atmosphere in the chamber 14 may be maintained either oxidizing, reducing or neutral in character by appropriately adjusting the ratio of gaseous fuel to combustion supporting gas in the combustible fuel mixture delivered to the inlet 36 of the manifold 35 and passing therefrom through the piping 33 to the burners 24.

In certain instances it may be desirable to dilute the heated products of combustion discharged from the burners 24 with air or an inert gas, such as nitrogen, for example, and then inject such gas mixture into the chamber 14. Such a modification is shown in Fig. 5 in which parts similar to those in the embodiment just described are designated by the same reference numerals.

In Fig. 5 a combustible fuel mixture, such as ordinary gas and air, for example, is supplied under pressure to the burners 24 located in the upper wider parts of the apertures 28 formed in the roof 20. The restricted outlets 25 of the burners are disposed immediately above and in alignment with Venturi-shaped passages 46 formed in members 47 positioned in the narrow bottom parts of the apertures 28.

In Fig. 5 the jets or streams of high temperature gases discharged from the restricted outlets 25 of the burners 24 induce flow of atmospheric air into the upper ends of the Venturi-shaped passages 46. In this way the energy of the driving high temperature gas jets, consisting substantially entirely of heated products of combustion, is effectively utilized to produce a uniform gas mixture which is discharged from the lower ends of the passages 46 at an extremely high velocity. The heated gas streams discharged from the Venturi-shaped passages 46 are injected into the upper ends of the Venturi-shaped passages 40, thereby inducing flow of gaseous atmosphere into the upper ends of the passages 40 in the same manner as in the first described embodiment.

By utilizing the high velocity gases discharged from the burners 24 to inspirate atmospheric air, the temperature at which the heated gases is introduced into chamber 14 is reduced. This is desirable where it is necessary to effect heat treating operations at temperatures considerably below the temperature of the heated products of combustion discharged from the burners.

In order to regulate the extent to which atmospheric air is mixed with the heated products of combustion, a suitable shutter may be provided at the top of each roof aperture 28. Such a shutter may include a stationary plate 48 provided with a number of openings and over which is mounted a rotatable plate 49 also provided with a number of openings. By adjusting the extent to which the openings in the plate 49 overlap the openings in the plate 48, the flow of air into the upper wider part of the roof apertures 28 may be controlled. In this way the temperature of the gas mixture injected into the upper ends of the Venturi-shaped passages 40 in the chamber 14 may be accurately controlled.

Instead of utilizing the heated gases discharged from the burners 24 to entrain atmospheric air, as just described, the roof apertures 28 may be connected to a source of supply of any other suitable gas, such as nitrogen, for example, for admixture with the high temperature gases. Further, the atmospheric air and other suitable gases may be supplied to the roof apertures 28 under slight pressure to facilitate the entrainment of such gases into the Venturi-shaped passages 46 while still taking advantage of the inspirating effect of the high temperature gases discharged at a high velocity from the burners 24.

While I have shown and described several embodiments of the invention, it will be apparent to those skilled in the art that various modifications and changes may be made without departing from the spirit and scope of the invention, as pointed out in the following claims.

What is claimed is:

1. A heating furnace characterized by the absence of a fan comprising structure forming a refractory lined heating space, a plurality of burners each having a refractory lined combustion chamber provided with an inlet adapted to receive a combustible fuel mixture and a restricted outlet through which heated products of combustion are adapted to be discharged at a relatively high velocity, wall means in said heating space adapted to form a central inner zone and an outer zone disposed about the inner zone, said zones being in open communication with each other and through and between which furnace gases may be circulated, said burners being constructed and arranged so that heated products of combustion adapted to be discharged through the outlets thereof in a plurality of gas streams are injected into one of said zones, and said wall means being formed so that the gases in the other of said zones are entrained by the injected gas streams into said one zone to cause circulation of the gases within said heating space and effect equalization of temperatures therein.

2. A heating furnace characterized by the absence of a fan comprising structure forming a refractory lined heating space, a plurality of burners each having a refractory lined combustion chamber provided with an inlet adapted to receive a combustible fuel mixture and a restricted outlet through which heated products of combustion are adapted to be discharged at a relatively high velocity, means including a plurality of refractory members substantially trapezoidal in transverse section and forming a part of the refractory lining for said space, each of said members being provided with a Venturi-shaped passage having entrance and discharge ends in open communication with spaced apart regions of said space, said burners being constructed and arranged so that heated products of combustion adapted to be discharged through the outlets thereof in a plurality of gas streams are injected into the entrance ends of said Venturi-shaped passages, whereby gases in said space are entrained by the injected gas streams into said Venturi-shaped passages to cause circulation of the gases within said heating space and effect equalization of temperatures therein.

3. A heating furnace characterized by the absence of a fan comprising structure forming a refractory lined heating space, a plurality of burners each having a refractory lined combustion chamber provided with an inlet adapted to receive a combustible fuel mixture and a restricted outlet through which heated products of combustion are adapted to be discharged at a relatively high velocity, inspirator means associated with each burner whereby the high velocity heated products of combustion entrain a gas for admixture therewith, wall means in said heating space adapted to form a plurality of zones in open communication with each other and through and between which furnace gases may be circulated, said inspirator means being constructed and arranged so that the heated products of combustion and gas admixed therewith are injected into one of said zones in a plurality of gas streams, and said wall means being formed so that the gases in the other of said zones are entrained by the injected gas streams into said one zone to cause circulation of the gases within said heating space and effect equalization of temperatures therein.

4. A heating furnace characterized by the absence of a fan comprising structure forming a refractory lined heating space, means including one or more burners each having a refractory lined combustion chamber provided with an inlet adapted to receive a combustible fuel mixture and a restricted outlet through which heated products of combustion are adapted to be discharged at a relatively high velocity, inspirator means associated with each burner whereby the high velocity heated products of combustion entrain a gas for admixture therewith, means providing one or more Venturi-shaped passages having the entrance and discharge ends thereof in open communication with spaced apart regions of said space, said inspirator means being constructed and arranged so that heated products of combustion and gas admixed therewith are injected into the entrance end or ends of said Venturi-shaped passage or passages, whereby the gases in said space are entrained by the injected gas stream or streams into said Venturi-shaped passage or passages to cause circulation of the gases within said heating space.

5. The method of heating a space having a periphery and a plurality of channels around its periphery which comprises effecting combustion of a fuel mixture at a plurality of points spaced around said periphery, discharging the products of combustion from said points into the channels as a plurality of high temperature gas streams at a high velocity, and circulating the gases in said space through the channels with the high temperature gas streams solely by the driving force of the latter to thereby produce a high degree of turbulence in said space to effect even heating of a charge therein.

6. A heating furnace comprising a refractory lined heating space provided with an enclosing wall, said wall being formed with a plurality of tubular passages therein extending generally in the direction of said space and being connected at each end with said space, a plurality of burners each having a combustion chamber provided with an inlet and an outlet through which heated products of combustion are discharged at a high velocity, means to mount said burners with a burner adjacent one end of each passage and in line therewith whereby the hot products of combustion are ejected into said passages, and means to supply fuel to said burners.

7. A heating furnace comprising a body portion formed with an open end chamber having a refractory lined wall, said wall being provided with a plurality of passages extending therethrough, the ends of said passages terminating adjacent the ends of said chamber, a cover for said furnace to close the end of said chamber, a plurality of burners located in said cover and aligned with said passages, each burner being provided with a combustion chamber having an inlet to receive a combustible mixture and an outlet through which heated products of combustion are discharged at a high velocity, said products of combustion passing through said passages to said chamber, said products of combustion producing an aspirating effect to create a flow of gas from said chamber through said passages and thereby create a turbulent atmosphere in said chamber.

8. A heating furnace comprising a body portion formed with an open end chamber having refractory lined side walls and bottom wall, said side walls being formed with a plurality of passages extending from the top thereof to a point adjacent said bottom wall and opening into said chamber, a cover for said chamber and said passageways and being so formed that the upper ends of said passageways are in communication with said chamber, a plurality of burners carried by said cover, each burner being aligned with one of said passageways and being provided with a combustion chamber having an inlet and an outlet through which heated products of combustion are discharged at high velocity through said passageways, and means to supply individually fuel to said burners.

9. A heating furnace comprising structure formed with a furnace chamber therein, said structure including a plurality of passages around the chamber and extending substantially parallel thereto, each of said passages being in open communication with said chamber at each end thereof, a plurality of burners acting when in operation to discharge a stream of high temperature gases therefrom, means to mount said burners so that each burner is aligned with and spaced from one end of one of said passages whereby the hot gases from the burners will enter said passages and entrain gases from said chamber therewith to cause circulation of gases within said chamber, and means to supply fuel to said burners.

10. A heating furnace comprising a body portion and a top therefor, said body portion being formed with a centrally disposed chamber and a plurality of passages surrounding said chamber and communicating therewith at each end, a plurality of burners each operative to discharge a stream of high temperature gases, means to mount said burners in said top with a burner aligned with each of said passages and spaced therefrom, the gases from said burners being discharged directly into said passages to thereby heat said passages and said chamber, said gases entraining gas from said chamber to thereby circulate the gases in said chamber, and said top being provided with an opening through which excess gas may exhaust.

CARL R. BERGER, Jr.

REFERENCES CITED

The following references are of record in the file of this patent:

UNITED STATES PATENTS

| Number | Name | Date |
|---|---|---|
| 957,873 | Fisher | May 17, 1910 |
| 1,284,711 | Kralund | Nov. 12, 1918 |
| 1,617,609 | Smith | Feb. 15, 1927 |
| 1,717,115 | McCann | June 11, 1929 |
| 1,734,387 | Lykken | Nov. 5, 1929 |
| 2,048,644 | Winder et al. | July 21, 1936 |
| 2,085,811 | Loftus | July 6, 1937 |

OTHER REFERENCES

Pages 49, 89, 90 of Industrial Furnaces, vol. II, 2nd edition, by Trinks. This text is published by John Wiley and Sons, New York, N. Y.